US012097992B2

(12) United States Patent
Risso et al.

(10) Patent No.: US 12,097,992 B2
(45) Date of Patent: Sep. 24, 2024

(54) CONTAINER FOR THE STORAGE AND/OR FERMENTATION OF ALCOHOLIC BEVERAGES

(71) Applicant: Clayver S.r.l., Vado Ligure (IT)

(72) Inventors: Luca Risso, Vado Ligure (IT); Maurizio Gasco, Vado Ligure (IT)

( * ) Notice: Subject to any disclaimer, the term of this patent is extended or adjusted under 35 U.S.C. 154(b) by 309 days.

(21) Appl. No.: 17/642,819

(22) PCT Filed: Sep. 18, 2020

(86) PCT No.: PCT/IB2020/058702
§ 371 (c)(1),
(2) Date: Mar. 14, 2022

(87) PCT Pub. No.: WO2021/053593
PCT Pub. Date: Mar. 25, 2021

(65) Prior Publication Data
US 2022/0371774 A1    Nov. 24, 2022

(30) Foreign Application Priority Data

Sep. 18, 2019  (IT) .................. 102019000016628

(51) Int. Cl.
*B65D 13/02*   (2006.01)
*B28B 1/00*    (2006.01)
(Continued)

(52) U.S. Cl.
CPC .............. *B65D 13/02* (2013.01); *B28B 1/002* (2013.01); *B28B 1/008* (2013.01); *B28B 1/14* (2013.01); *C12C 13/00* (2013.01)

(58) Field of Classification Search
CPC ......... B65D 13/02; B28B 1/002; B28B 1/008; B28B 1/14; B28B 23/00; C12G 1/02; C12C 13/00; C12H 1/22
(Continued)

(56) References Cited

U.S. PATENT DOCUMENTS 3,106,885 A    10/1963  Kelley
2010/0288130 A1*  11/2010  Eustis .................. C12H 1/14
                                             99/277.1
(Continued)

FOREIGN PATENT DOCUMENTS

CN         2897831        5/2007
DE      202013011467      3/2014
(Continued)

*Primary Examiner* — Nathan J Jenness
*Assistant Examiner* — Eric C Baldrighi
(74) *Attorney, Agent, or Firm* — Themis Law

(57) ABSTRACT

A container for food liquids, in particular for the storage and/or fermentation of alcoholic beverages, has a body in which a substantial portion of the walls of the container is made of a ceramic material with controlled porosity. The body of the container is shaped as a truncated pyramid, in which each of the faces of the side wall includes a slab of ceramic material with controlled porosity, and in which a support structure made of cementitious material is formed along the external corners of the side wall and in correspondence with the bases of the truncated pyramid. Axial openings are defined in the bases of the container and are adapted to cooperate with suitable closing members.

10 Claims, 6 Drawing Sheets

(51) Int. Cl.
*B28B 1/14* (2006.01)
*C12C 13/00* (2006.01)

(58) Field of Classification Search
USPC ..................................... 220/62.12
See application file for complete search history.

(56) References Cited

U.S. PATENT DOCUMENTS

2016/0113301 A1\* 4/2016 Kociolek ........... B65D 43/0216
    215/386
2017/0029755 A1  2/2017 Mostert

FOREIGN PATENT DOCUMENTS

| EP | 3460034 | 3/2019 | |
|----|---------|--------|------|
| EP | 3460034 A1 \* | 3/2019 | ............... C12G 1/02 |
| WO | 2019076996 | 4/2019 | |

\* cited by examiner

CONTAINER FOR THE STORAGE AND/OR FERMENTATION OF ALCOHOLIC BEVERAGES

The present invention relates to containers for food liquids, and in particular relates to containers for the preservation and/or fermentation of alcoholic beverages.

Historically, numerous different materials have been used to make containers for the fermentation of alcoholic beverages, commonly called vats. Wood, terracotta, steel, reinforced resins have been used from time to time to conduct the fermentation processes, and in particular that of vinification.

Document WO2018163026, of which the same applicant is the owner, describes a container for the fermentation of alcoholic beverages made of ceramic material with controlled porosity, a characteristic which makes it particularly suitable for the aging phase of alcoholic beverages, in particular of wines.

A drawback highlighted by the technique described in this document is linked to the need to make ad hoc molds for the different sizes of the vats, with the consequent difficulty in making suitable homogeneous material castings, so as to preserve the transpiration characteristics.

Document WO2019/076996 describes a container, in particular for food products and in particular for oenological products, which comprises an internal shell wall consisting of a plurality of panels of porous material such as terracotta, stoneware or the like. These panels are directly in contact with the liquid with their side facing the inside of the container, while they are held in position thanks to an external cylindrical shell wall. This cylindrical internal wall is made of metal, for example steel and is completely closed, i.e. continuous, effectively covering the corresponding sides of the panels entirely towards the outside of the container, that is, the sides of the latter opposite the internal compartment of the container. The chambers formed between the containment wall and external metal support and the side of the porous material panels facing this wall are intended to assume the function of conduits for a forced flow of air or other gas in order to ensure osmotic exchange between liquid and atmosphere outside the container. Furthermore, the metal wall which completely encloses said porous panels towards the outside also has a thermal barrier function in combination with the chambers for the forced flow of gas. Therefore, in this embodiment the exchange due to the porosity of the material of the panels requires both a system for the supply of forced air and an air conditioning system. The chambers that are completely closed to the outside also involve maintenance problems, i.e. cleaning and possibly controlling the humidity inside them.

Document DE 202013011467 describes a container in particular for alcoholic beverages such as wine or the like, which is made according to two different alternatives. A first alternative provides a wall of rocky or mineral material, such as marble or other type of rock, which is made of a continuous tubular shape, thanks for example to a cup wheel that cuts an external circular wall and a wall from an internal circular block thus creating a cylindrical element of stone material.

A second alternative instead provides that the inner shell wall of the container is made up of a plurality of slabs or plates placed side by side and arranged so as to form a tubular element with a polygonal section. The slabs are held in position by a casting of concrete or other material made in a mold box. This casting forms a continuous external layer which holds the sheets in position together, completely covering the external surface of said sheets, that is the surface of the same facing the external environment.

The above prevents permeability of the container wall thanks to the particular particle size and therefore an exchange between the liquid in the container and the external environment. Furthermore, the material of the slabs indicated in the document is of a rocky or stone type and therefore has a very low and insufficient porosity. By adding the external layer to the slabs, the porosity and permeation capacity of the wall by gases and/or humidity is compromised or drastically reduced.

The purpose of the present invention is therefore to provide a container for the fermentation and/or storage of alcoholic beverages in which a substantial portion of the walls of said container is made of ceramic material with controlled porosity, assembled in a simple way and adaptable to a wide spectrum of formats, without losing the transpiration characteristics of the aforesaid ceramic material.

The object of the present invention is therefore a container for the fermentation and/or storage of alcoholic beverages, in which a substantial portion of the walls of said container is made of controlled porosity ceramic material, comprising a container body in the shape of a truncated pyramid, in which each of the faces of the side wall comprises a slab in ceramic material with controlled porosity, a support structure in cementitious material being formed along the external edges of said side wall and in correspondence with the bases of said truncated pyramid, and suitable axial openings formed in said bases, suitable for cooperating with suitable closing means, and in which said support structure in cementitious material overlaps only partially with the external side of said slabs, covering them towards the environment outside the container leaving a greater part of the surface of the side of said facing slabs and towards the outside of the container directly in contact with the external environment or the atmosphere external to the container itself.

Preferably, this characteristic is provided for all the slabs which constitute the shell wall of the container.

However, it is also possible to provide executive variants in which only a part of the slabs has the aforementioned characteristics, while the other slabs are completely covered with the material that forms the support structure.

A further variant can provide that the extension of the part of the surface covered by the support structure is variable from slab to slab between the slabs that form the shell wall of the container.

In this way it is possible to further calibrate the transpiration capacity during the project, i.e. the porosity of the mantle wall which can be easily adapted to certain climatic conditions or to certain products and/or certain types of fermentation and/or conservation processes and/or aging.

In particular, said support structure overlaps for a peripheral band of predetermined width on the surface of the external side of said slabs, leaving all the remaining part of said surface of said sternal side free and therefore in contact with the external environment.

An embodiment provides that said part of each slab not covered by the supporting structure varies between about 70 and 95% of the overall surface of the slab itself.

According to an embodiment, the aforesaid closing means are made of steel.

In a preferred embodiment, said truncated pyramid is a truncated right pyramid, and in particular it is a regular truncated pyramid. Advantageously, the base polygon has from 4 to 10 sides.

A further object of the present invention is a method for manufacturing a container of the type described above, comprising the steps of: determining the number of sides of the base and the volume of the container; shaping of each of the slabs of ceramic material with controlled porosity; assembly of the side wall of the container with suitable adhesive means; insertion of the side wall into a suitable mold and shaping of the support structure in cementitious material, by casting or pouring said cementitious material and limiting the overlapping of the cementitious material of the support structure to a peripheral band of each slab of material for such a width to leave free a part of the external surface of each slab which is greater than the part of the external surface of said slab on which the cementitious material of the support structure is superimposed; application of the closing means to the openings provided in the bases of the truncated pyramid-shaped container body.

In a preferred embodiment variant, the closing means are positioned directly inside the mold for making the support structure.

Advantageously, said slabs of controlled porosity ceramic material are made with a thickness of between 10 millimeters and 40 millimeters, and are shaped by large slabs, made of a ceramic material.

Further advantages and characteristics of the container according to the present invention will become evident from the description of an embodiment of the same yield, by way of non-limiting example, with reference to the attached drawings, in which.

Figure 1:
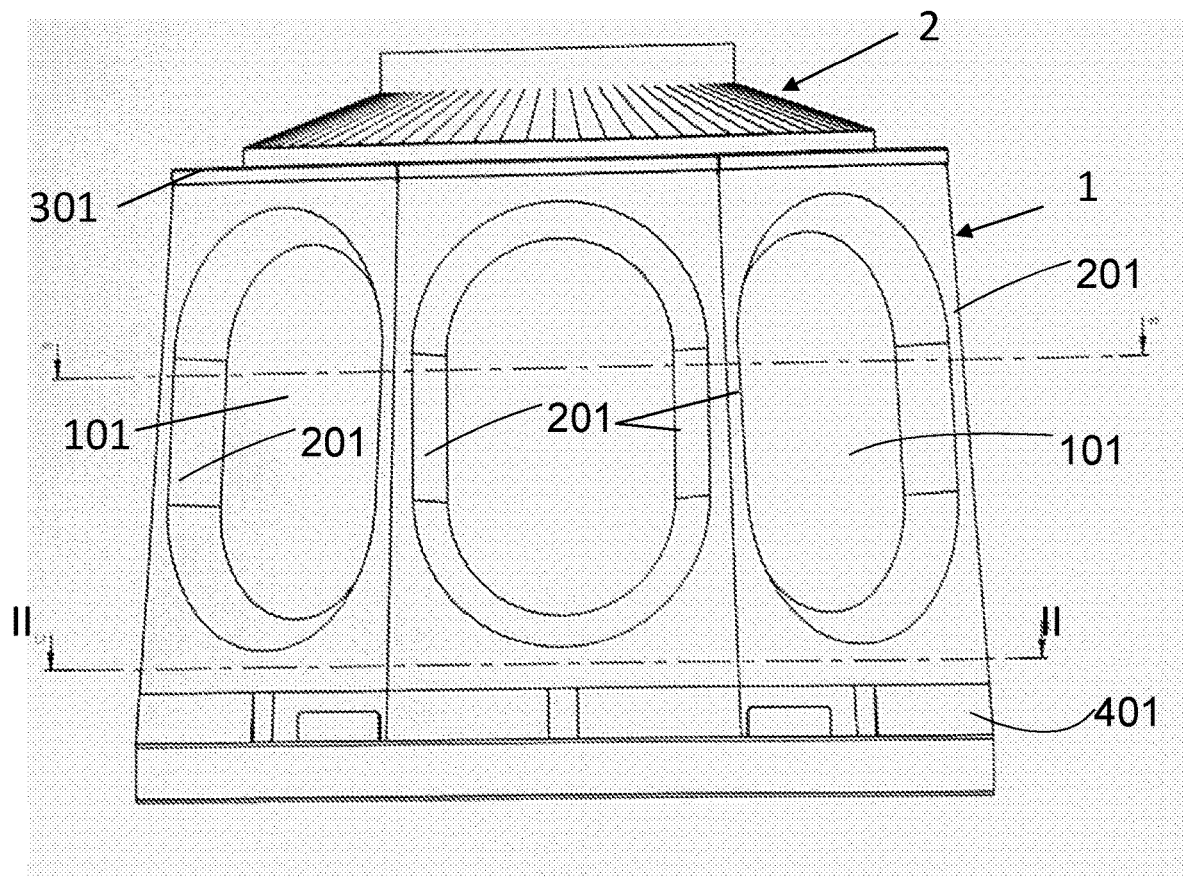
FIG. 1 is a side elevated view of an embodiment of the container according to the present invention.

FIG. 1 illustrates an embodiment of the container according to the present invention; 1 indicates the body of said container, comprising a plurality of slabs 101 assembled to form the side wall of a regular octagonal pyramid trunk, said side wall being surrounded by a support structure comprising the uprights 201, located at the corners of the lateral wall, the major base 401 and the minor base 301, in which the closing means 2 are positioned.

Figure 2:
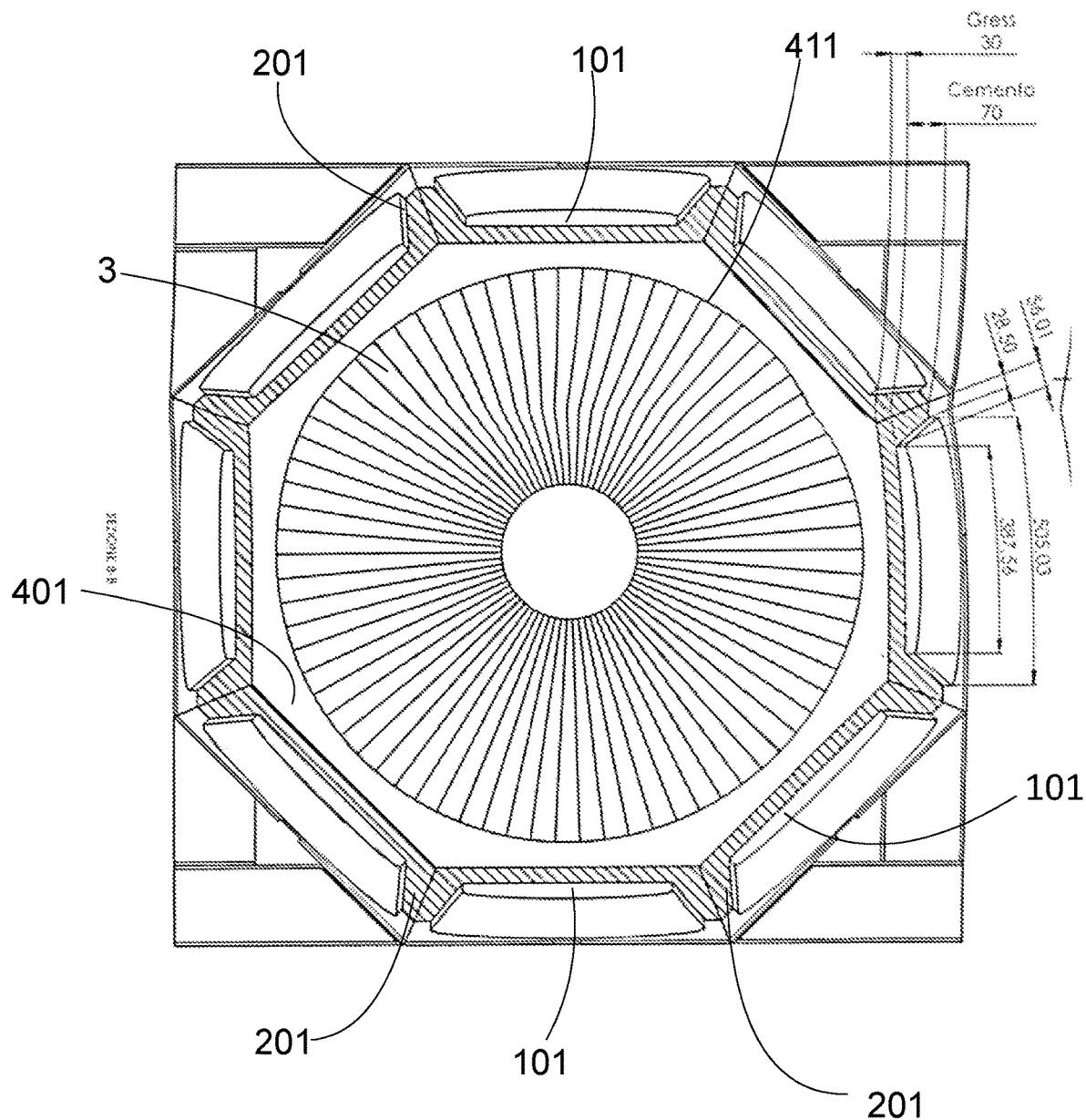
FIG. 2 is a cross-sectional view along the line II-II of FIG. 1.

In FIG. 2 the container of FIG. 1 is sectioned along the line II-II; equal parts correspond to equal numerals. The figure shows the positioning of the closing means 3 arranged in the opening 411 formed in the larger base 401. Furthermore, it is evident that the different slabs 101 are arranged consecutive to each other.

Figure 3:
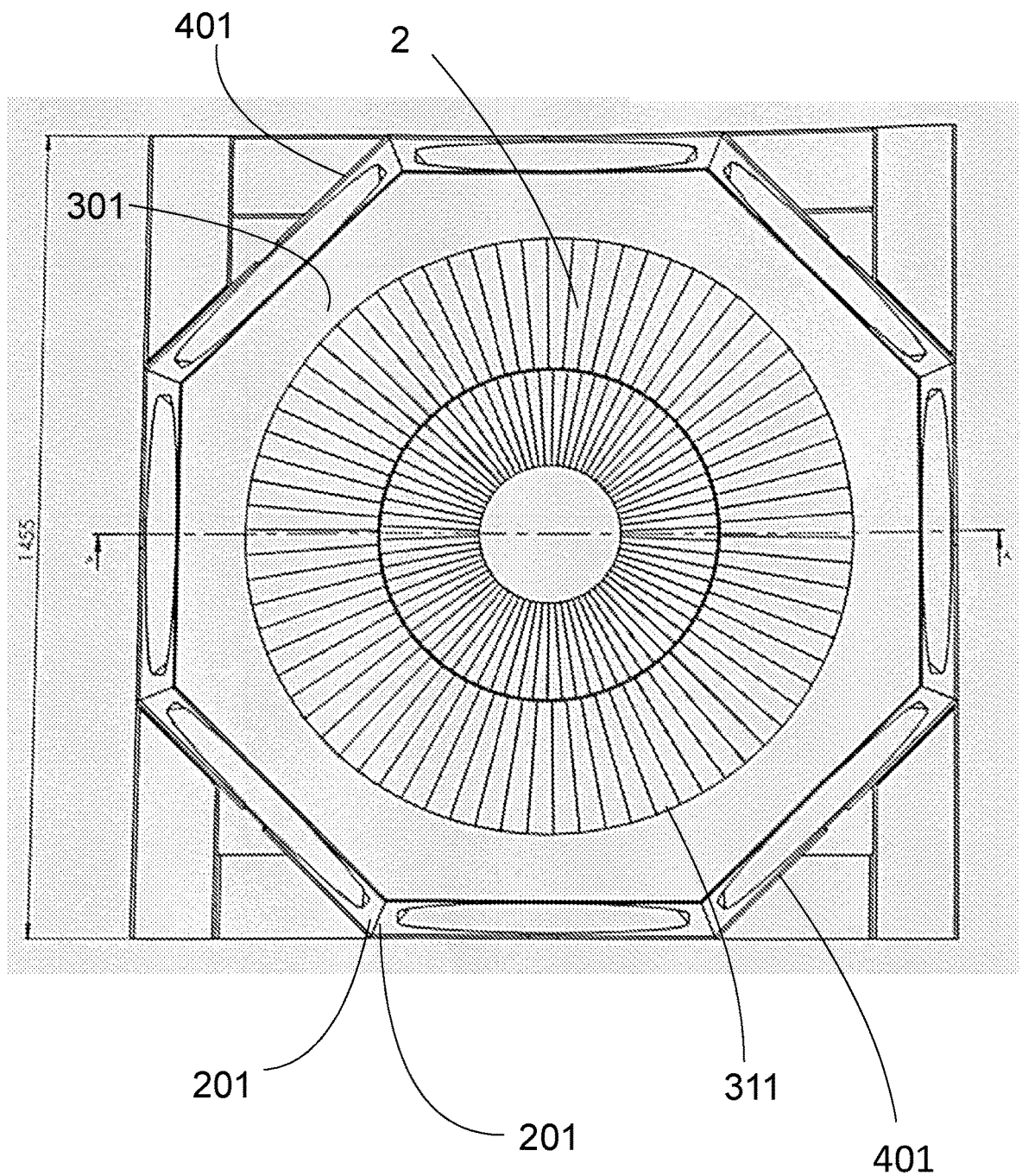
FIG. 3 is a top plan view of the container of FIG. 1.
Figure 4:
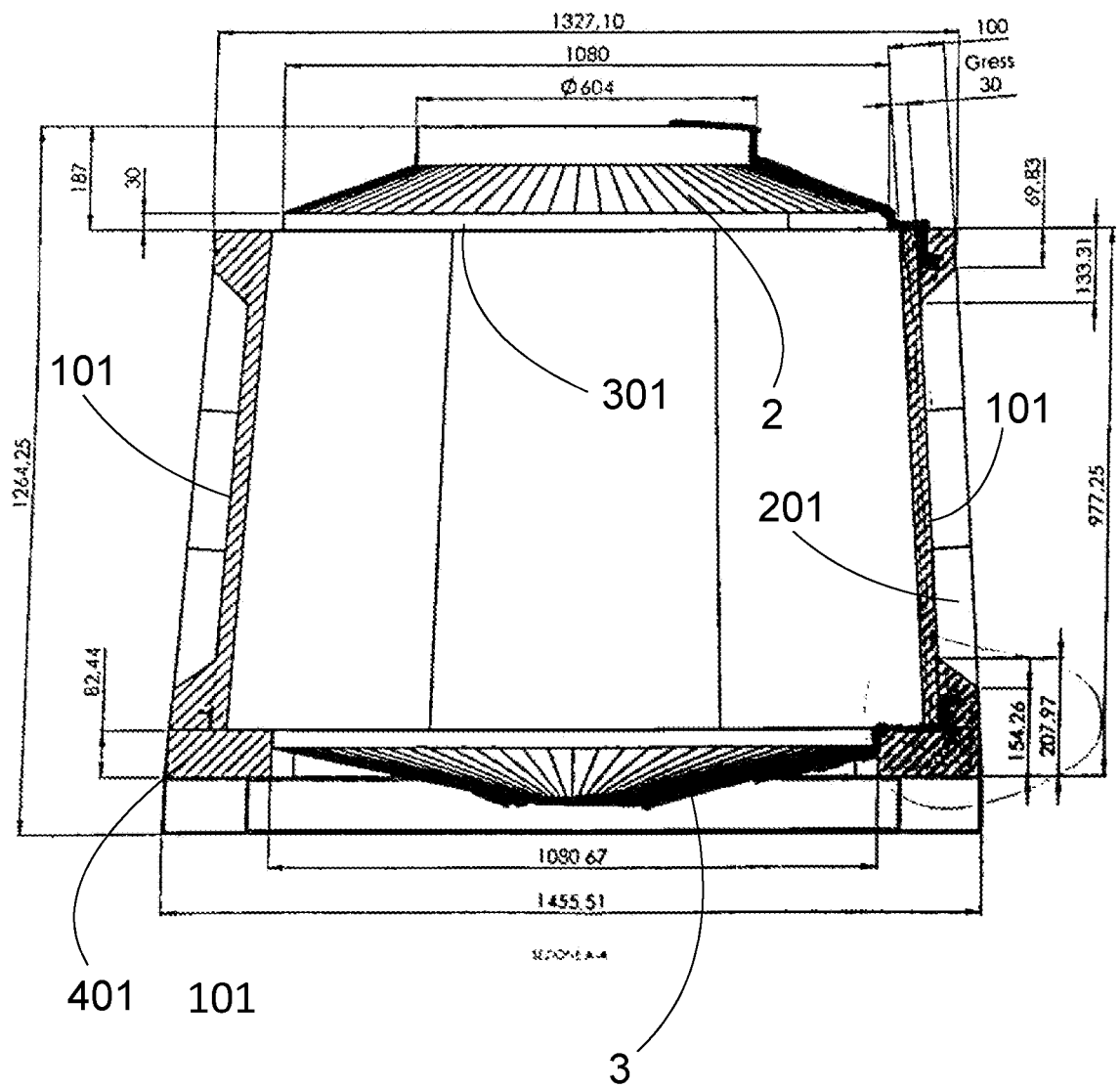
FIG. 4 is a longitudinal section view along the line IV-IV of FIG. 3.
Figure 5:
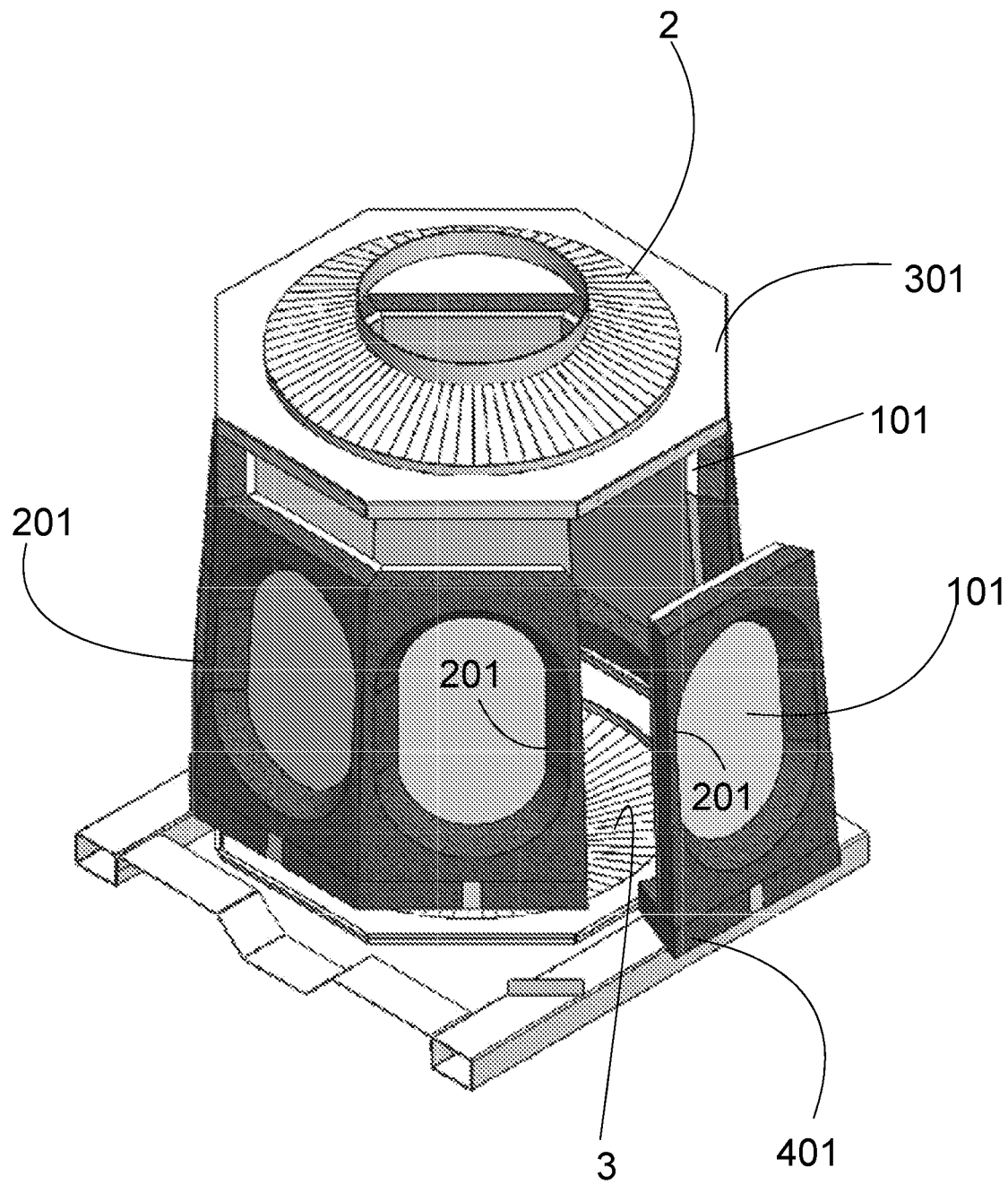
FIG. 5 is a perspective view with exploded parts of the container of FIG. 1.

FIGS. 3 and 4, in which the same parts correspond to the same numerals, allow the most complete structural view of the container according to the present invention, as well as the exploded perspective of FIG. 5, which allows to view the fundamental components of the container, i.e. the wall side facing inwards, consisting of the slabs 101 in ceramic material with controlled porosity, the support structure in cementitious material, consisting of the uprights 201 and the bases 301 and 401, and the closing means 2 and 3 in steel, located in the respective openings 311 and 411 of the bases 301 and 401.

As is evident from the figures, said uprights 201, the elements of the minor base and of the major base 301, 401 of the support structure, form a sort of frame which overlaps with said uprights 201 and with said bases 301, 410 to a peripheral band of the surface of the side of the base 301 facing the outside of the container, leaving free and directly accessible from the external environment an area of considerably greater size in the central area of each slab 101.

In essence, the supporting structure forms a sort of peripheral frame for the slabs since all the frames are joined together in one piece in the supporting frame common to all the slabs 101.

Figure 6:
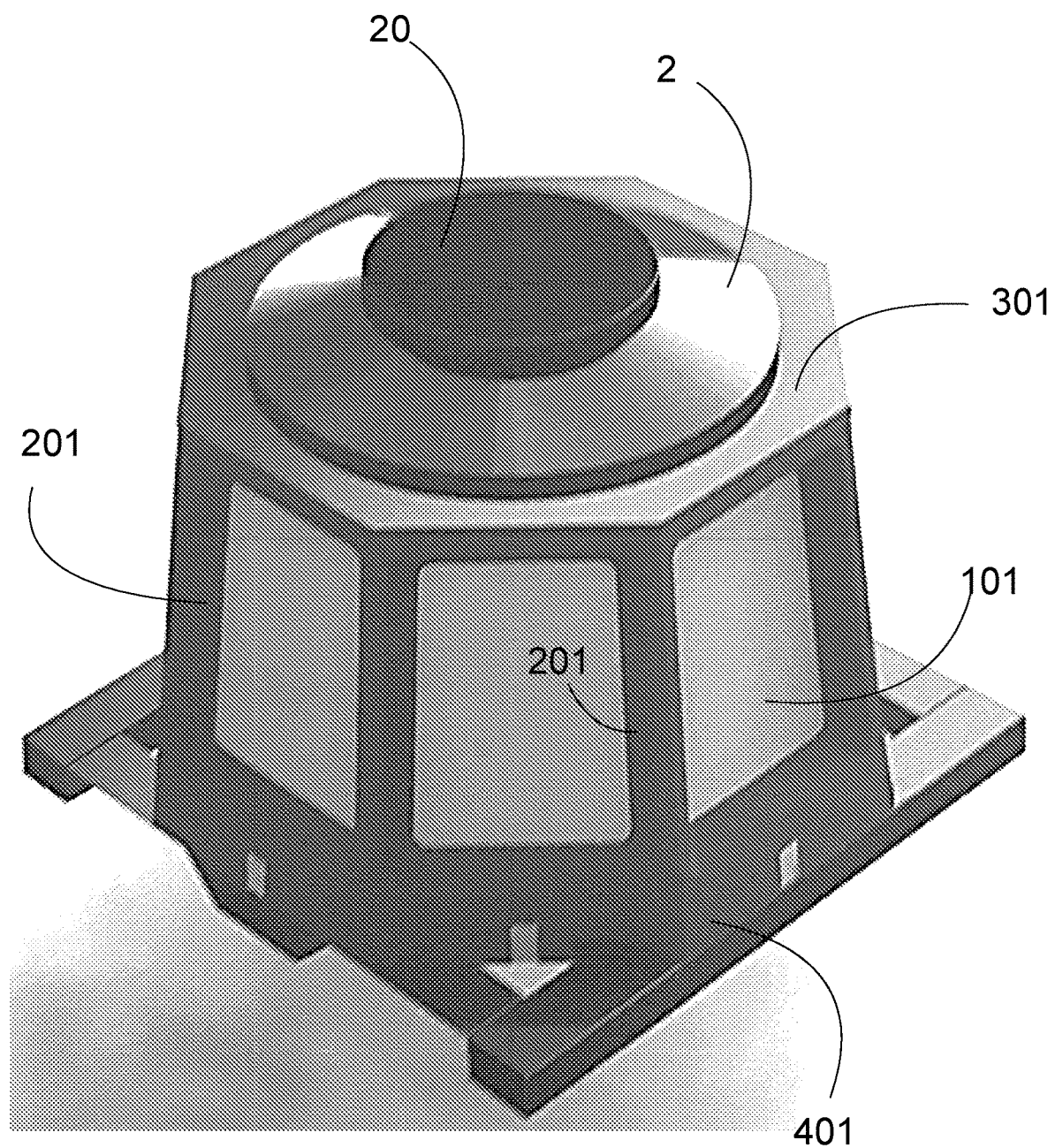
FIG. 6 illustrates a perspective view of an embodiment variant of the container according to the present invention.

Different embodiments are possible as shown in the examples of FIGS. 5 and 6.

In FIG. 6 the upper cover 2 is provided with a cap 20 which closes the central opening of the same and which can be opened, i.e. separable from the cover 2 as shown in the figures of the previous example in which said cap is missing It is clear that by changing the ratio between the area of the surface of the external side covered by the load-bearing structure and the area of said surface directly exposed to the external environment, it is possible to calibrate the permeability characteristics of the casing wall of the container even in the presence of sheets of permeable material controlled and constant for each slab.

Different variants are possible which provide that all or only some of said slabs have a central part of a predominant area directly exposed to the external environment, that is, not covered by the load-bearing structure.

In this case, some or all of the sheets may have a different degree of coverage of the surface of the external side of the same with the material of the supporting structure.

Alternatively or in combination, some slabs can also be completely covered by the material of the supporting structure.

The variants described above therefore make it possible to always use the same type of sheet and to calibrate the overall permeability of the container wall according to the specific use by operating on the ratio between the covered surface and the uncovered surface and directly exposed to the environment.

The aspect of the art will understand that this type of calibration can easily take place during manufacturing and thanks to an experimental process in relation to a specific type of product and possibly also to the environmental conditions in which the containers are intended to operate.

Generally, but not limitatively for oenological products, the percentage of the surface of each slab is directly exposed to the external environment, which is not covered by the supporting structure is between 70 and 95% of the total area of the outer side surface of the same Operation and the construction of the container according to the present invention will appear evident from the following. With reference to the known art document WO2018163026 cited in the introduction, it was considered, in the course of the research that led to the present invention, that the production of molds for large-sized products, such as the components for the construction of a container for the fermentation and/or storage of alcoholic beverages, can lead to criticalities in the production of the ceramic material with controlled porosity, at the risk of effectively compromising the enjoyment of its peculiar characteristics; one of the effects found is that the material, during the drying and subsequent sintering phase, undergoes changes in state that can generate structural criticalities due to the larger dimensions and therefore the high weight of the product itself.

The container according to the present invention allows to realize the ceramic material in an extremely controlled way, starting from the formation of large slabs which are then shaped in the most appropriate way and assembled using adhesive materials suitable for food use. The determination of the number of faces of the side wall, i.e. the number of sides of the bases, is a fair compromise between a reasonably low number of sections and a container shape as rounded as possible, in order to make the movements of the liquid more homogeneous inside it. In the illustrated embodiment, the regular truncated pyramid has eight faces on its side wall.

The slabs which are shaped on the basis of the initial project are then joined together and inserted into a mold, preferably together with the closing means of the bases, that is, suitably formed steel slabs on which doors or manhole covers can be subsequently mounted.

The container according to the present invention therefore has most of the surface in contact with the alcoholic beverage endowed with the peculiarities of a ceramic material with controlled porosity, and exhibits constructive specificities that make it extremely interesting in the panorama of the sector.

It is worth remembering that particularly with regard to fermentation processes in general, and in particular the winemaking processes, including those relating to the conservation and/or aging of the product, these processes are extremely delicate. Therefore, the use of materials that directly promote the natural mechanisms of the process avoids plant complications and also the acquisition and maintenance costs of the same, which strongly affect the profitability of production especially for medium and small wineries.

The invention allows the processes to be kept naturally regulated with a simple container which operates on the basis of natural principles and which avoids high purchase and maintenance costs.

The invention claimed is:

1. A container for fermentation and/or storage of alcoholic beverages, the container having walls made at least in part of ceramic material with controlled porosity, the container comprising:
    a container body shaped as a truncated pyramid, the container body having a side wall with faces that comprise slabs in said ceramic material with controlled porosity;
    a support structure in cementitious material formed along external edges of said side wall and at bases of said truncated pyramid; and
    axial openings formed in said bases, configured to cooperate with closing members,
    wherein said support structure in cementitious material overlaps only partially an external side of said slabs, covering said slabs towards an external environment leaving a greater uncovered part of a surface of a side of said slabs facing an outside of the container directly in contact with the external environment or an atmosphere external to the container.

2. The container according to claim 1, wherein said support structure overlaps, for a peripheral band of a predetermined width, a surface of the external side of said slabs leaving an entire remaining part of said surface of said external side free and in contact with the external environment.

3. The container according to claim 1, wherein said closing members are made of steel.

4. The container according to claim 3, wherein said closing members comprise formed steel slabs, configured so that doors or manhole covers can be mounted thereon.

5. The container according to claim 1, wherein said truncated pyramid is a truncated right pyramid.

6. The container according to claim 4, wherein said truncated pyramid is a regular truncated pyramid.

7. The container according to claim 6, wherein the base is shaped as a polygon having 4 to 10 sides.

8. The container according to claim 1, said slabs of the controlled porosity ceramic material are made with a thickness between 10 and 40 millimeters.

9. A method of manufacturing a container according to claim 1, comprising the steps of:
    determining a number of sides of the base and a volume of the container;
    shaping of each of the slabs of the ceramic material with controlled porosity;
    assembling the side wall of the container with an adhesive product;
    inserting the side wall into a mold and shaping the support structure in cementitious material by casting or pouring said cementitious material and limiting an overlapping of the cementitious material of the support structure to a peripheral band of each slab for a width so as to leave free a first part of an external surface of each slab, which is greater than a second part of the external surface of said slab on which the cementitious material of the support structure is superimposed; and
    applying the closing members to the axial openings provided in the base of the container body.

10. The method according to claim 9, wherein the closing members are positioned inside the mold for producing the support structure.

* * * * *